US007227075B2

(12) United States Patent
Chang et al.

(10) Patent No.: US 7,227,075 B2
(45) Date of Patent: Jun. 5, 2007

(54) LIGHTING CONTROLLER

(76) Inventors: Henry Chang, 950 Sixth Ave., #335, San Diego, CA (US) 92101; Erik Stauber, 3437 Arizona St., San Diego, CA (US) 92104

( * ) Notice: Subject to any disclaimer, the term of this patent is extended or adjusted under 35 U.S.C. 154(b) by 135 days.

(21) Appl. No.: 10/913,081

(22) Filed: Aug. 6, 2004

(65) Prior Publication Data

US 2006/0027081 A1 Feb. 9, 2006

(51) Int. Cl.
*G01H 7/00* (2006.01)
*G01H 1/00* (2006.01)

(52) U.S. Cl. .................... 84/645; 84/464 R; 84/477 R; 84/483.2; 84/723; 340/815.46; 345/73

(58) Field of Classification Search .................. 84/645, 84/477 R, 723, 672, 483.2, 464 R, 464 A; 362/562, 85; 386/97, 54; 345/73; 340/815.46
See application file for complete search history.

(56) References Cited

U.S. PATENT DOCUMENTS 1,432,553 A * 10/1922 Hector ..................... 84/464 R
1,690,279 A * 11/1928 Craft ........................ 84/464 R
1,913,233 A * 6/1933 De Francesco ........... 84/464 R
3,018,683 A * 1/1962 Way ......................... 84/464 R
3,240,099 A * 3/1966 Irons ........................ 84/464 R
3,241,419 A * 3/1966 Gracey ...................... 84/464 R
3,540,343 A * 11/1970 Rifkin ...................... 84/464 R
3,636,515 A * 1/1972 Smith ......................... 367/199
3,869,699 A * 3/1975 Haller et al. ................ 367/197
3,919,915 A * 11/1975 Isbell .......................... 84/484
4,185,276 A * 1/1980 Benson .................. 340/815.46
4,995,026 A * 2/1991 Makabe et al. ............... 369/70
5,070,399 A * 12/1991 Martel ......................... 381/56
5,083,064 A * 1/1992 Jones, Sr. ................... 315/294
5,191,319 A * 3/1993 Kiltz ........................... 345/73
5,402,702 A * 4/1995 Hata ........................ 84/464 R
5,439,170 A * 8/1995 Dach ........................... 239/18
5,461,188 A * 10/1995 Drago et al. .............. 84/464 R
5,528,255 A * 6/1996 Hagimori ..................... 345/35
5,561,257 A * 10/1996 Cardey et al. ................ 84/626
5,769,527 A * 6/1998 Taylor et al. ................. 362/85
5,818,342 A * 10/1998 Solomon et al. ....... 340/815.46
5,917,288 A * 6/1999 Feldman et al. ......... 315/169.3
5,922,981 A * 7/1999 Ballister ................... 84/464 A
6,029,122 A * 2/2000 Hunt .......................... 702/188
6,031,343 A * 2/2000 Recknagel et al. ......... 315/292
6,137,042 A * 10/2000 Kurtzberg et al. ........ 84/477 R
6,827,464 B2 * 12/2004 Koren et al. .................. 362/96
6,930,235 B2 * 8/2005 Sandborn et al. .......... 84/483.2
2002/0154787 A1 * 10/2002 Rice et al. .................. 381/124
2004/0139842 A1 * 7/2004 Brenner et al. ........... 84/477 R
2005/0275626 A1 * 12/2005 Mueller et al. ............. 345/156

* cited by examiner

*Primary Examiner*—Lincoln Donovan
*Assistant Examiner*—Christina Russell
(74) *Attorney, Agent, or Firm*—Gordon & Rees, LLP

(57) ABSTRACT

In the present invention, a lighting controller is provided to provide illumination based upon the playing of musical instruments. The lighting controller is programmed with lighting profiles which control the lights on a device. When musical instrument is played, a note (event) is detected by a transducer and based upon which event has been detected, a signal is sent to the lighting controller to determine which lighting profile to send to the device. Upon determining the proper lighting profile. a signal is sent from the lighting controller to the device causing the device to illuminate.

15 Claims, 7 Drawing Sheets

LIGHTING CONTROLLER

FIELD OF THE INVENTION

The present invention relates to the illumination of lights based upon the playing of musical instruments.

BACKGROUND OF THE INVENTION

Playing music or conducting musical performances in conjunction with lights is well known. In the prior art, various types of lights are lit up as the music is playing. An example of this is at the Bellagio™ hotel in Las Vegas where water and lights are choreographed to music.

In prior art systems, musical performance lighting is less adjustable, less programmable and less able to correlate the light with the sound of the music. Typically, prior art systems use lighting controllers such as the Martin Xciter Lighting Controller to display lights during a musical performance. The Martin Xciter is either triggered by "listening" to the music and reacting to what it hears, or by receiving some sort of master signal that tells the various lights attached to the Martin Xciter to do something, such as light up in a certain sequence.

The problem with these prior art systems is that the digital signal processing used by the lighting controllers to "listen" cannot differentiate between sounds beyond basic frequency segregation. For example, the lighting controllers are able to distinguish between four (4) frequency bands, but are not able to distinguish and react accordingly to other parameters that define a sound, such as echoes, attack time, decay times, precise power spectrum/time profile, etc. Furthermore, because the lighting controllers must listen to the sound, an individual instrument is much more difficult to respond to because sound from other instruments will contaminate the signal.

In view of the prior art, what is needed is a lighting controller that has the ability to distinguish and react accordingly to other parameters that define a sound. Furthermore, a lighting controller that monitors the activity of one or more musical instruments and based upon this activity, turns on light.

SUMMARY OF THE INVENTION

It is the object of the present invention to provide a lighting controller that differentiates between sounds within frequency bands.

It is yet another object of the present invention to provide a lighting controller that is able to distinguish and react accordingly to other parameters that define a sound, such as echoes, attack times, decay times, precise power spectrum/time profile, etc.

It is a further object of the present invention to monitor the activity of one or more musical instruments.

It is yet a further object of the present invention wherein illumination of light correlates with the sound of the instrument(s).

It is yet a further object of the present invention to provide instant reaction time since the lighting controller does not have to listen to the sound to trigger lights, the light and the sound are triggered at exactly the same time.

It is yet a further object of the present invention to provide precise lighting control for individual instruments and individual notes.

It is yet a further object of the present invention to tailoring the illumination to match the sound.

It is yet a further object of the present invention to send multiple lighting channels to each instrument or each note within an instrument, allowing multiple colors to be used with each note.

In the present invention, a lighting controller is provided to provide illumination based upon the playing of musical instruments. The lighting controller is programmed with lighting profiles which control the lights on a device. When musical instrument is played, a note (event) is detected by a transducer is sent to the lighting controller to determine which lighting profile to send to the device. Upon determining the proper lighting profile, a signal is sent from the lighting controller to the device causing the device to illuminate. The illumination provides visual feedback that correlates with sound and enhances the experience of the audience.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

The lighting controller of the present invention monitors the activity of one or more musical instrument(s) and provides the means to illuminate the same instruments as well as other devices, such as external equipment, containing lights. Examples of the types of musical instruments that can be used include drums, marimbas, xylophones, keyboards, stringed instruments, wind instruments, and digital controllers (instruments that adjust parameters of a synthesizer). However, the instruments listed are by way of example, and those skilled in the art will recognize that the principles and teachings described herein may be applied to a variety of instruments and other applications, such as the movement of water triggered by the playing of musical instruments.

The instruments may be acoustic or synthetic (controllers which drive internal or external synthesizers.) Furthermore, the instruments may have only one note/sound per instrument, such as a single drum, or they may have many notes/sounds per instrument, such as a xylophone. The lighting controller of the present invention can control the lights on each instrument and each separate note in each instrument independently.

Figure 1:
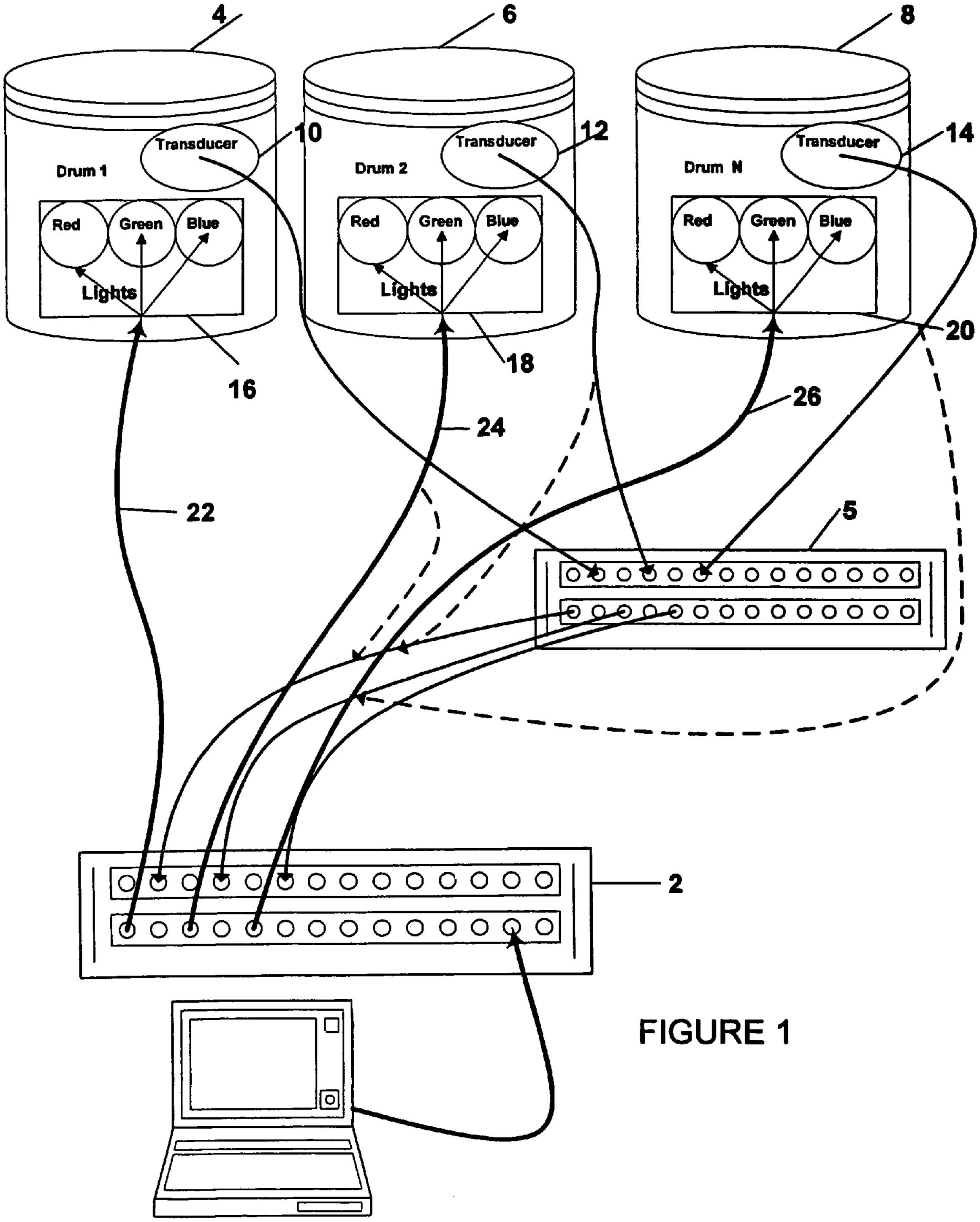
FIG. 1 illustrates a lighting controller of the present invention utilized with multiple single-channel instruments to illuminate lights.

Turning to FIG. 1, a lighting controller 2 of the present invention, utilized with multiple single-channel instruments, is illustrated. The lighting controller 2 is connected to three musical instruments, in this example three drums 4, 6, 8. Although drums are shown, any type of musical instrument can be utilized. When a person plays a note ("event"), in this case a drum beat, a transducer 10, 12, 14 detects the event and sends a signal to either an external signal processor 5 or directly to the lighting controller 2. A transducer is connected to each one of the instruments. In this example, drum #1 4 has transducer #1 10, drum #2 6 has transducer #2 12 and drum #N 8 has transducer #N 14. Also included in this example are a set of lights for each drum. Each drum has a set of red, green and blue lights 16, 18, 20 that are utilized to light up the instrument. If an external signal processor is used, the external signal processor 5 relays the event to the lighting controller 2. In the case of a synthetic instrument, the lighting controller 2 may share the same transducer used to send data to the synthesizer.

The data from the event may contain different types of information, including but not limited to, how loud the note was played, how long the note was played for, and the exact location on the drum where the musician made contact. Unlike prior art systems, the system of the present invention can accept one type of information, or it can accept multiple types of information that relate to a single event. Once the event signal(s) have been received, the lighting controller 2 outputs signals 22, 24, 26 that control the lights that correspond to the drum that generated the original event. The signals sent to the lights can power the lights directly, or an additional amplifier and/or processor can be used The signals sent to the light will depend on the information from the original event, and will depend on the settings that have been programmed to go with that particular instrument. Thus, the lighting controller 2 creates illumination for the instrument that correlates with how it is being played with the sound it makes. There are many ways that the lighting controller 2 could be set to illuminate an instrument or other device with lights. For example, the louder the instrument is played, the brighter the lights are, thus creating audible/visual correlation. Another example is lighting duration. An instrument with a long sustained sound would get a light signal that turns on the lights for a long time, and an instrument with a short sound would get a light signal that turns on the lights for only a short time. Furthermore, if an instrument creates a sound that gradually increases in volume, the lighting controller 2 can send signals that turn on the lights equally slowly.

The lighting controller 2 can control one or more lights per instrument (for single note instruments such as a single drum), or it can control one or more lights per note (in an instrument with more than one (1) note). The ability to control one or more lights per instrument or one or more lights per note enables the system to use a single color, or multiple colors that can be mixed to create any color. The way the colors can be mixed can be adjusted, for example, to create a deep blue, only the blue channel would be used. To create a light blue, the blue channel with a little bit of the green channel could be used. To create orange, the green and red channels could be used. Additionally, all channels can be varied as a function of time, so that the mixed color will appear to morph. For example, if a drum is hit, the initial light can be made to be green, and then the green can fade while a blue ramps up. This will have the effect of the drum, or any other device with lights, initially being green and turning blue. As another example, the initial hit of the drum can be represented by a fading blue-green combination.

Figure 2:
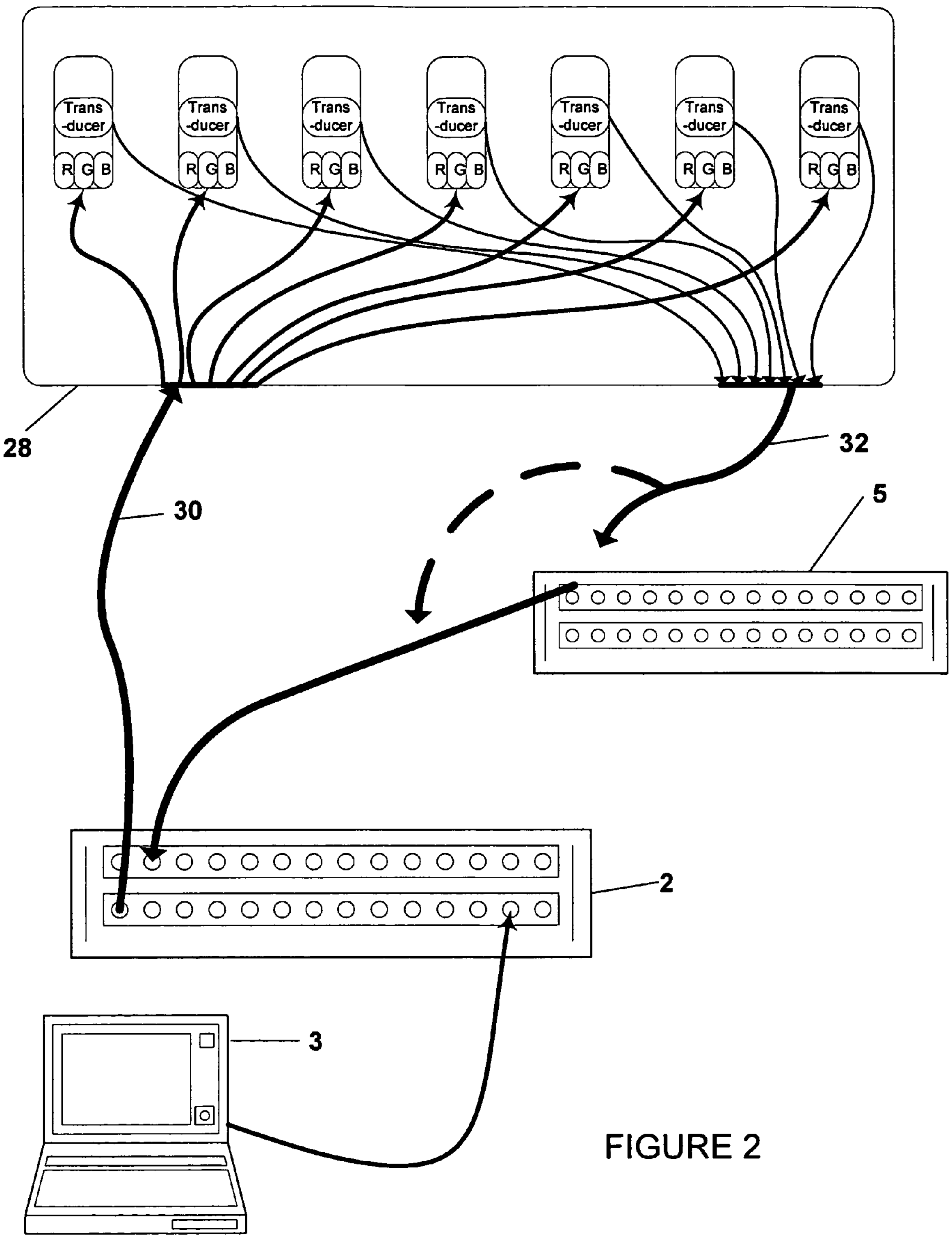
FIG. 2 illustrates a lighting controller of the present invention utilized with multi-channel instruments to illuminate lights.

FIG. 2 illustrates a lighting controller 2 of the present invention that utilizes multi-channel instruments to illuminate lights. The lighting controller 2 is connected to an instrument with multiple channels 28 by a bus connection 30 that carries multiple channels to drive each light individually. Each light has a transducer as well as the colors red, green and blue. A second bus connection 32, which contains signals sent from the transducer for each light, is sent to either an external signal processor 5 and then to the lighting controller 2 or directly to the lighting controller 2. The second bus connection 32 carries the trigger signals that indicate which note was played and how it was played. A computer 3 is utilized to program the lighting controller with a lighting profile for each song that will be played.

Figure 3:
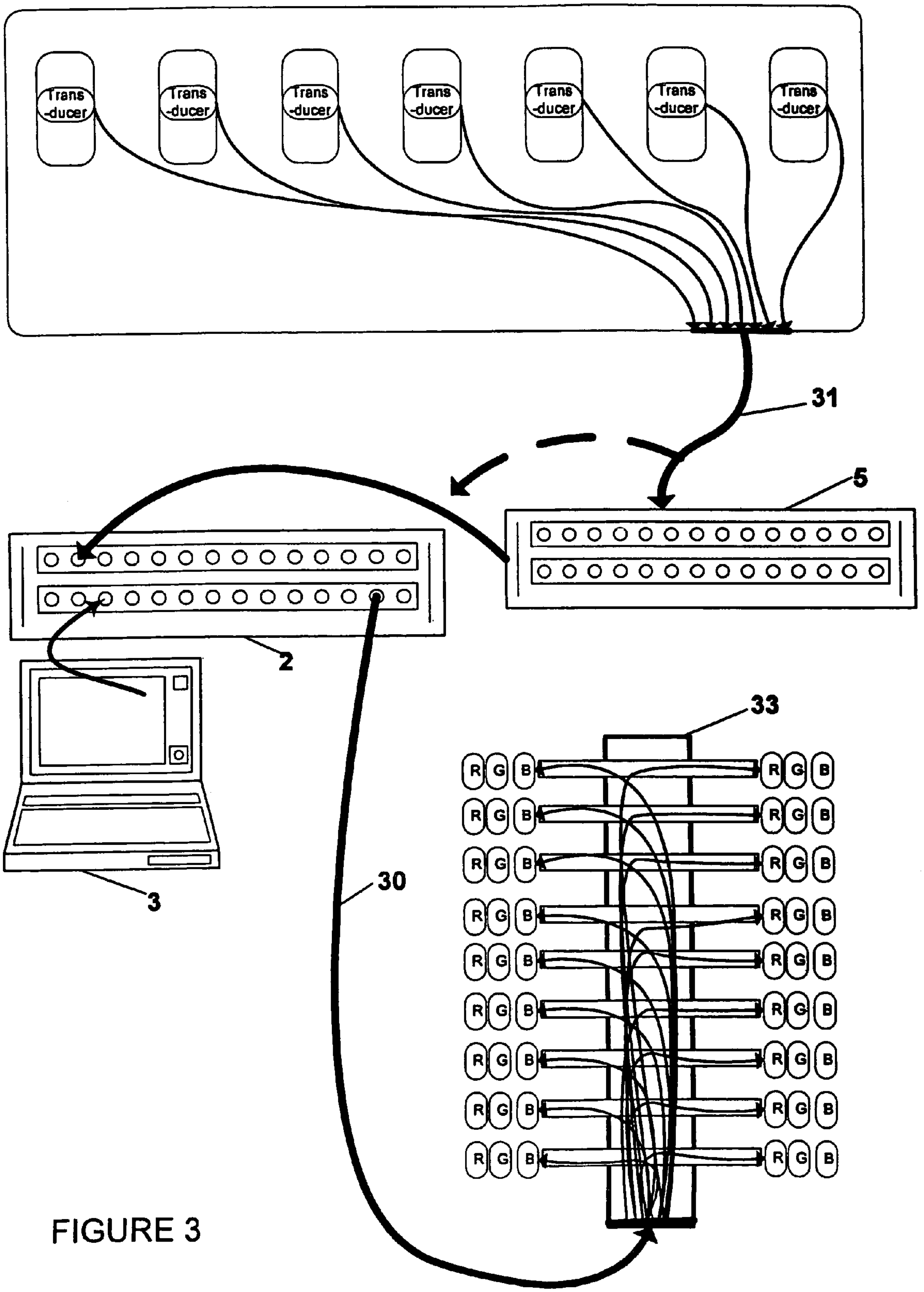
FIG. 3 illustrates a lighting controller of the present invention utilized with multi-channel instruments to illuminate lights mounted on external devices.

FIG. 3 illustrates a second embodiment of the present invention in that a lighting controller is utilized with multi-channel instruments to illuminate lights mounted on external devices. As in FIG. 2, a bus connection 31, which contains signals sent from the transducer for each channel of the instrument, is sent to either an external signal processor 5 and then to the lighting controller 2 or directly to the lighting controller 2. The bus connection 32 carries the trigger signals that indicate which note was played and how it was played. Based upon the trigger signals, the lighting controller 2 sends signals over a bus connection 30 to an external device, stage prop. or equipment 33 containing lights. A computer 3 is utilized to program the lighting controller with a lighting profile for each song that will be played. Although the external equipment may not be an instrument, the audience will make a perceived association between the instrument being played and the external equipment, because the lights on the external equipment will be reactive to whatever is being played. FIG. 3 is an example of an external stage prop being used with the lighting controller and an instrument.

In an alternative embodiment, multiple lighting controllers may be used on the same instrument. For example, one lighting controller may be used to light up the instrument, and another lighting controller may be used to light up a piece of external equipment. The lighting controllers will receive the same trigger data, but may be programmed to do the same or different things with that trigger data. There is no limit to the number of lighting controllers that can be used with a particular instrument.

Figure 4:
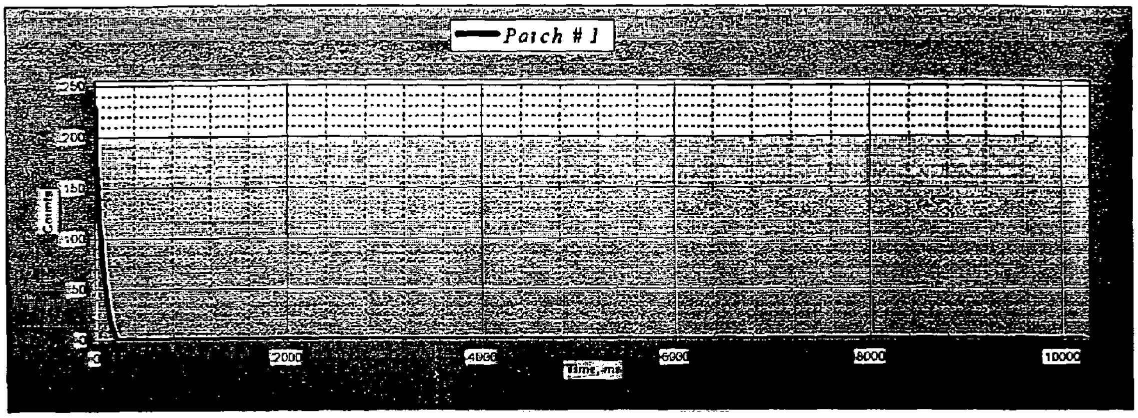
FIG. 4 illustrates a graph of a light that decays to zero in approximately 230 ms.
Figure 5:
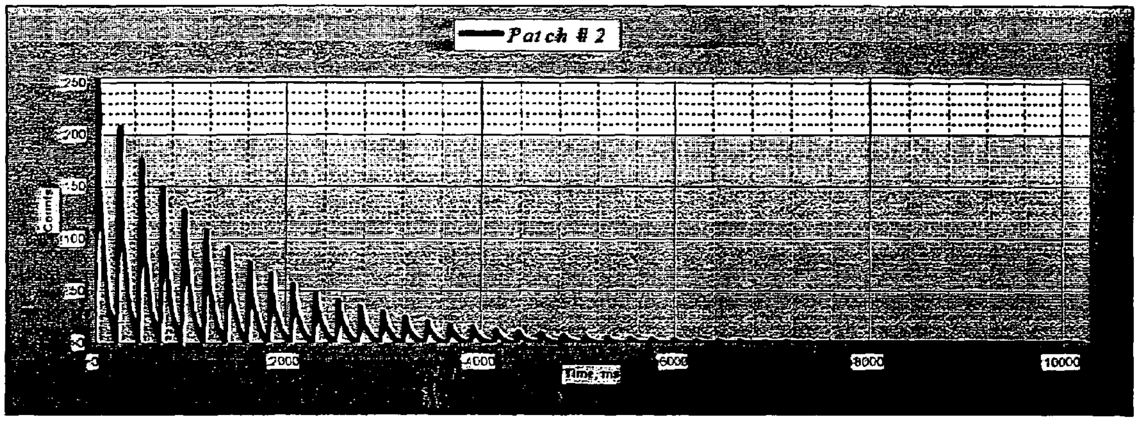
FIG. 5 illustrates the graph of a light that is decaying in an "echo" pattern.
Figure 6:
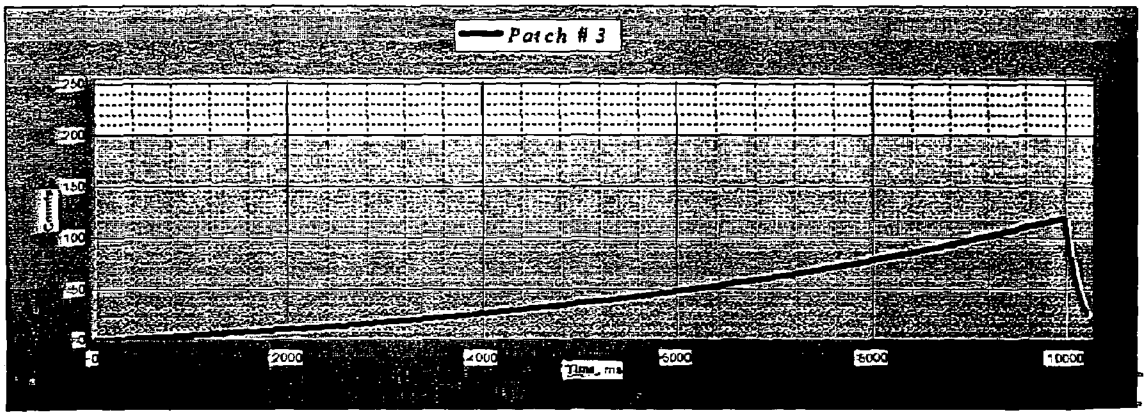
FIG. 6 illustrates the illumination of light to approximately half-power in a slowly increasing pattern that takes 10 sec.

The lighting effects can be altered or adjusted over time to illuminate the light in a particular way. The effects of the lights are plotted in a graph that illustrates channel output vs. time curves. The exact shape of the graph can be adjusted to achieve any lighting effect. FIG. 4 illustrates a graph of a light that decays to zero in approximately 230 ms. FIG. 5 illustrates the graph of a light that is decaying in an "echo" pattern. FIG. 6 illustrates the illumination of light to approximately half-power in a slowly increasing pattern that takes 10 sec.

In addition to controlling the lights directly, the lighting controller 2 could also be used to control shutters or other mechanisms that would have the same effect of producing variable light output. Any type of light can be used with the lighting controller 2, such as LED's, lasers, tungsten lights, fluorescents, LCDs, neon lights and vapor discharge lights. One of ordinary skill in the art will understand that this is not an exhaustive list and many other types of lights may be used.

The lighting controller 2 of the present invention is also able to store multiple settings in its memory. Channel output vs. time curves and the responses vs. how the instruments are played are all stored in memory. Multiple settings for each channel can be stored and called up at any time. For example, one setting or song might be to have a drum or other device fade from red to blue, and another setting or song might have the same device or drum turn on green and red, with the red channel's brightness dependent on how hard the drum was hit. The lighting controller 2 also proves an external interface that may be used with a computer or additional controller. This enables different settings or profiles to be programmed into the lighting controller 2, as well as the ability to change which of the stored settings is active on each channel. This external interface can also be used to trigger the lights.

In the preferred embodiment of the present invention, the lighting controller is comprised of a custom motherboard that has 48 channels and can drive up to 16 separate instruments with 3-channels each. The motherboard can drive high power LEDs directly, such as Luxeons™ made by Lumileds™, and can source up to 30V at 1.5 A per channel. So, for example, if the motherboard of the present invention drives 3 1-Watt Luxeons™ per channel, a total of 144 W (48*3) maximum output per motherboard is created. The motherboard can drive all channels at this output at the same time without overheating.

Figure 7:
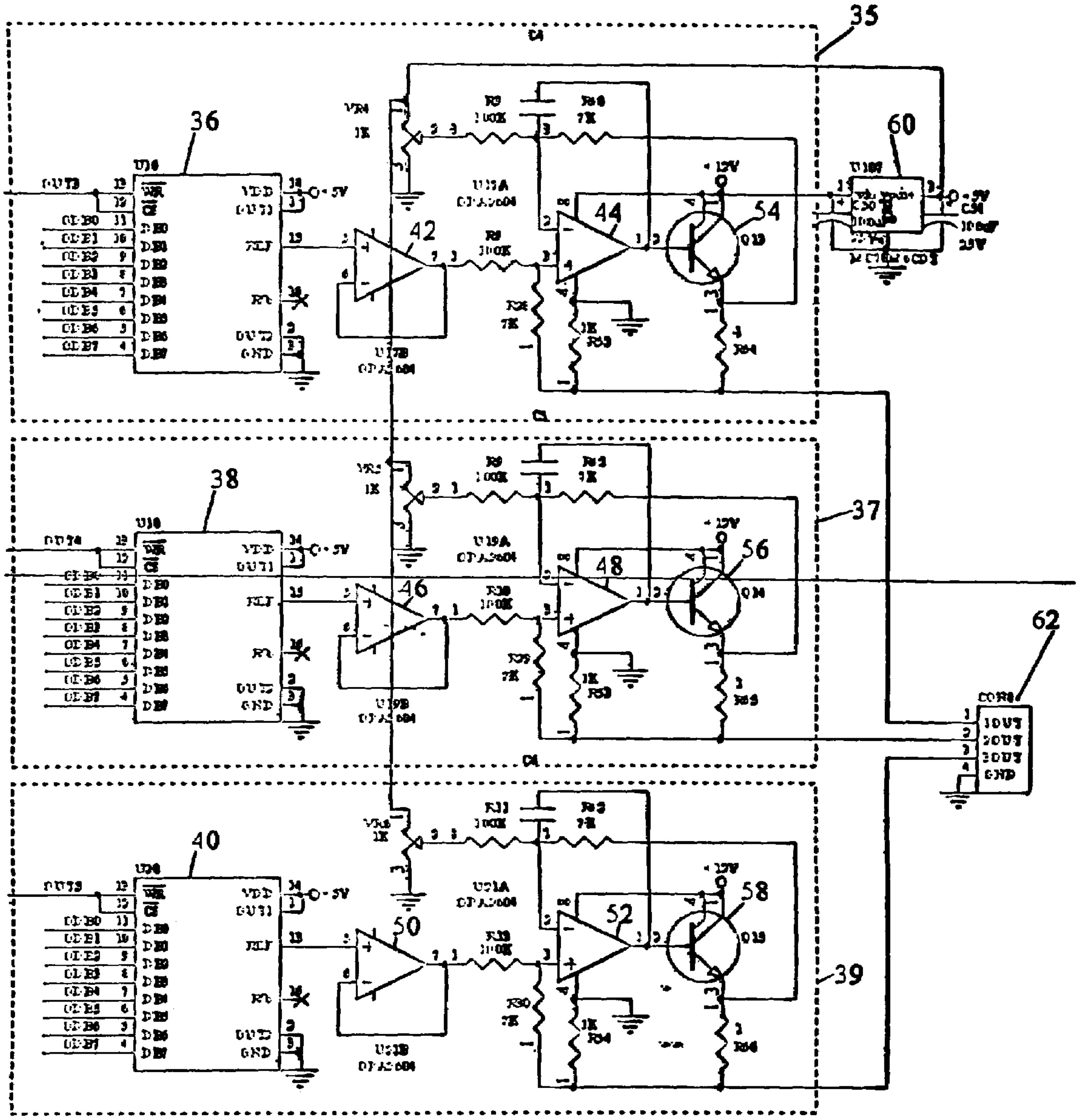
FIG. 7 illustrates a partial schematic of the motherboard showing 3 of the 48 current drive circuits.

FIG. 7 illustrates a partial schematic of the motherboard showing three (3) of the 48 current drive circuits. The three (3) circuits are by way of example only and the other 45 drive circuits on the motherboard are the same. A constant current amplifier circuit controls each channel. In each circuit is 8-bit DAC (digital to analog converter) 36, 38, 40 drives a series of OP-AMPS 42, 44, 46, 48, 50, 52 and a power transistor 54, 56, 58 that drives current output of the channel, and the lighting controller is therefore able to linearly control the light output of the lights, such as LEDs, with 256 possible light levels, from 0 (off) to 255 (full on). The constant current amplifier circuitry can respond to changes in desired output within 1 millisecond.

The lighting controller in FIG. 7 utilizes a microcontroller 60, such as a 26 Mhz Rabbit 2000, to write to the DAC's on the motherboard and a complex programmable logic device (CPLD), such as an Altera Max7000, to address the DAC's 36, 38, 40 on the motherboard. An internal timer on the microcontroller 60 updates each channel once every 0.01 sec (100 Hz), which is fast enough to create the visual impression that the lights react instantly. Built into the motherboard is a Musical Instrument Digital Interface (MIDI) connection for receiving trigger events. MIDI is a protocol designed for recording and playing back music on digital synthesizers that is supported by all companies that make synthesizers, keyboards and other digital performance equipment. In the preferred embodiment, instruments utilized with the present invention have MIDI triggers and therefore can be directly plugged into the lighting controller. The lighting controller interprets several MIDI messages, including Note-On, Velocity, Program Change and System Real-time. Furthermore, any MIDI message can be interpreted by modifying the software.

Figure 8:
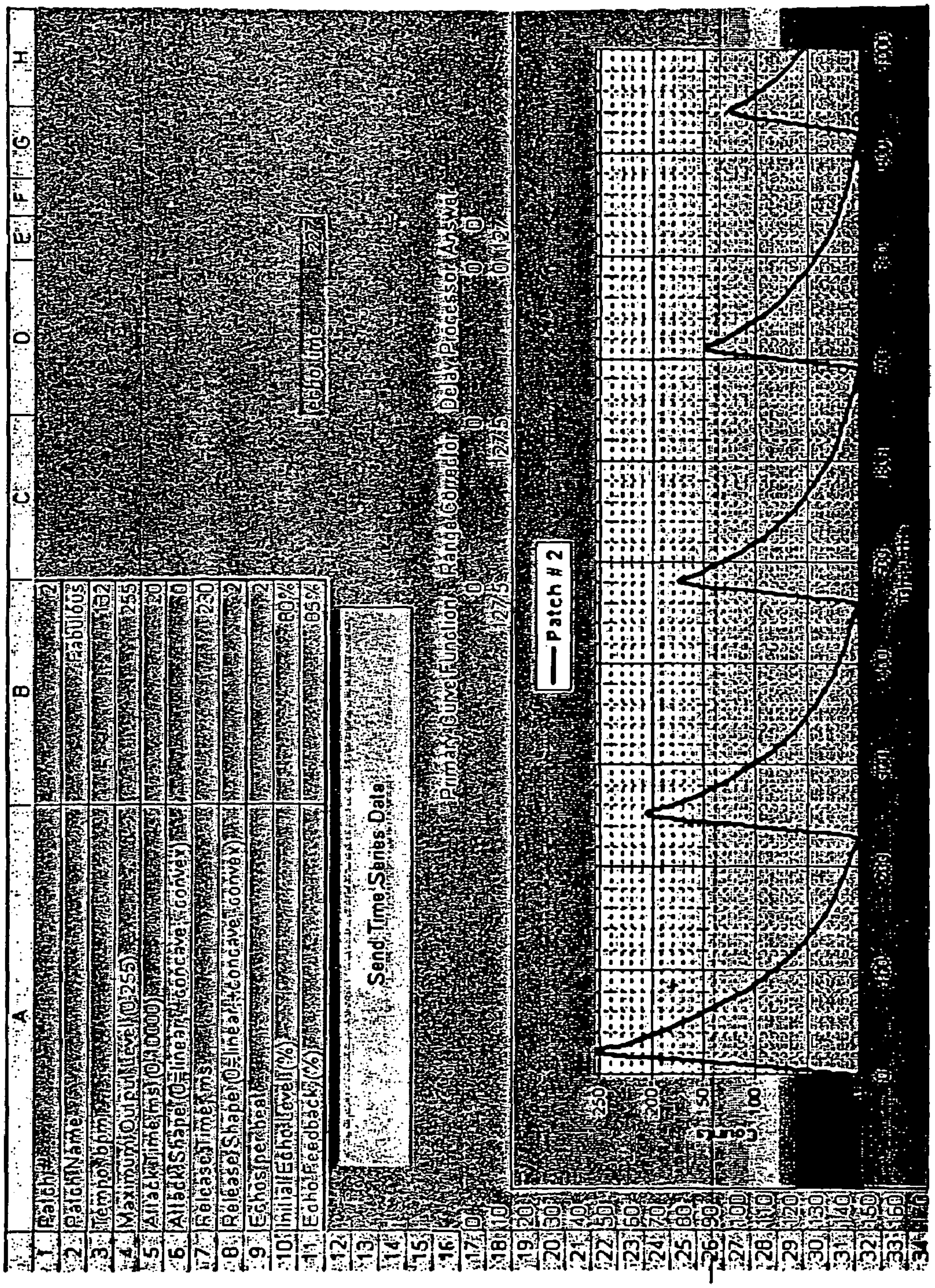
FIG. 8 illustrates an example of a program written in a spreadsheet that is downloaded to the light controller.

The three amplifier circuits shown in FIG. 7 constitute the individual current drive for the respective channel. The three channel outputs 35, 37, 39 from the amplifier circuits are grouped together into a single connector 62, such as a MOLEX 22-23-2041, and are attached to a cable that is connected to red, green and blue lights, such as LEDs. A serial interface board that provides a 19200-baud RS232 connection is plugged into the motherboard and allows a standard computer to be used with the lighting controller for programming lights. A lighting profile can be created for each song and then downloaded into the lighting controller. FIG. 8 illustrates an example of a program written in a spreadsheet that is downloaded to the lighting controller. In the preferred embodiment, the lighting controller has memory spots for 64 types of light profiles, each lasting up to 10 seconds at a refresh rate of 100 Hz. Furthermore, there are also 64 master settings, called performances, with each performance specifying which of the 64 light profiles are assigned to which channel. This allows nearly limitless possible combinations. A 2-character display can be utilized with the lighting controller to indicate what master performance is currently selected.

In an alternative embodiment, multiple lighting controllers and multiple motherboards can be linked together and driven by a single processor. The motherboard has the capability to function as a "master" or a "slave", allowing for more than 48 channels to be used. For example if an instrument is used that has 6 boards linked together, 288 channels are allowed and can be arranged on the instrument as 96 3-channel (Red, Green and Blue) notes.

Although an exemplary embodiment of the invention has been described above by way of example only, it will be understood by those skilled in the field that modifications may be made to the disclosed embodiment without departing from the scope of the invention, which is defined by the appended claims.

We claim:

1. A method of controlling the illumination of lights on a plurality of musical instruments, the method comprising the steps of:

a user programming a plurality of lighting profiles into a lighting controller to control the lights on the plurality of musical instruments;

the lighting controller detecting notes being played on the plurality of musical instruments by separate transducers on each of the plurality of musical instruments;

the lighting controller determining which lighting profile to use with each of the lights on each of the musical instruments; and illuminating the lights on each of the musical instruments according to the user programmed lighting profiles selected by the lighting controller.

2. The method of claim 1, wherein the lights are LEDs and wherein at least one musical instrument is a drum.

3. The method of claim 1, wherein the first signal is sent to a signal processor before being sent to the lighting controller.

4. The method of claim 1, wherein at least one musical instrument is a multi-channel instrument.

5. The method of claim 1, wherein at least one musical instrument has multiple notes to be played.

6. The method of claim 1, wherein the at least one lighting profile correlates to a song.

7. A system for controlling the illumination of a plurality of lights with a plurality of musical instruments, the system comprising:

a separate transducer on each of a plurality of musical instruments;

a user-programmable lighting controller for receiving signals from each of the separate transducers on each of the plurality of musical instruments as the musical instruments are being played, for storing a plurality of user-programmed lighting profiles therein, and for selecting a particular user-programmed lighting profile for each of the signals received from each of the separate transducers, the user-programmable lighting controller comprising:

at least one drive circuit, the drive circuit comprising:

a series of op amps driven by a digital to analog converter; and a power transistor connected to the output of the series of op amps, the power transistor drives the current of the at least one drive circuit;

a microcontroller for writing to the digital to analog converter; and a complex programmable logic device for addressing the digital to analog converter.

8. The system of claim 7, wherein the microcontroller comprises an internal timer that updates the at least one drive circuit every 0.01 second creating a visual impression that the lights react instantly.

9. The system of claim 7 further comprising a musical digital interface connection for receiving trigger events.

10. The system of claim 9, wherein the trigger events are the playing of the plurality of musical instruments.

11. The system of claim 7, wherein three drive circuits are combined into a single connector.

12. The system of claim 11, wherein the single connector is attached to a cable connected to red, green, and blue lights.

13. The system of claim 12, wherein the lights are LEDs.

14. The system of claim 7, wherein the lighting controller is programmed with at least one lighting profile corresponding to at least one song.

15. The system of claim 7, wherein at least one lighting profile is assigned to each of the at least one drive circuits.

* * * * *